US008529177B2

(12) United States Patent
Toosky et al.

(10) Patent No.: US 8,529,177 B2
(45) Date of Patent: Sep. 10, 2013

(54) INTEGRATED PIN/SLEEVE BLIND FASTENER

(75) Inventors: Rahmatollah F. Toosky, San Clemente, CA (US); Nicholas A. Elliott, Mission Viejo, CA (US)

(73) Assignee: Polaris Fastening Consulting, LLC, San Clemente, CA (US)

( * ) Notice: Subject to any disclaimer, the term of this patent is extended or adjusted under 35 U.S.C. 154(b) by 381 days.

(21) Appl. No.: 13/026,271

(22) Filed: Feb. 13, 2011

(65) Prior Publication Data
US 2011/0200409 A1     Aug. 18, 2011

Related U.S. Application Data

(60) Provisional application No. 61/304,765, filed on Feb. 15, 2010.

(51) Int. Cl.
   *F16B 13/04*   (2006.01)
(52) U.S. Cl.
   USPC .............................................. 411/43; 411/34
(58) Field of Classification Search
   USPC .............................. 411/42, 43, 34, 38, 45, 80.5
   See application file for complete search history.

(56) References Cited

U.S. PATENT DOCUMENTS

| 3,698,278 | A | * | 10/1972 | Trembley | 411/34 |
| 4,355,934 | A | * | 10/1982 | Denham et al. | 411/38 |
| 7,038,842 | B2 | * | 5/2006 | Griseri et al. | 359/334 |
| 7,566,195 | B2 | * | 7/2009 | Hull | 411/43 |
| 2004/0231467 | A1 | | 11/2004 | Hufnagl et al. | |
| 2005/0002760 | A1 | | 1/2005 | Hayashi et al. | |
| 2005/0201844 | A1 | | 9/2005 | Davies et al. | |
| 2006/0193711 | A1 | | 8/2006 | Di-Mola | |
| 2007/0009338 | A1 | | 1/2007 | Hull | |
| 2008/0075555 | A1 | | 3/2008 | March et al. | |

FOREIGN PATENT DOCUMENTS

| JP | 08061348 A | 3/1996 |
| JP | 2006038201 A | 2/2006 |

* cited by examiner

*Primary Examiner* — Gary Estremsky
(74) *Attorney, Agent, or Firm* — Heidi L. Eisenhut; Loza & Loza LLP

(57) ABSTRACT

A fastener, capable of securing work pieces accessible from only one side, is provided. The blind fastener includes a deformable sleeve and a pin, the pin having a main body section and a tail section. The main body section includes a shear load bearing section integrally connected to a lock collar engagement section on a first end and a pin stalk section on a second end, the pin stalk section integrally connected to a series of pin sleeve integrating grooves. The tail section is integrally connected between the main body, via a break notch, and a series of serrations. The sleeve includes a hollow tubular shank having a first sleeve end and a second sleeve end, where the first sleeve end has a sleeve head having an opening for receiving the main body section. At all times during assembly of the fastener, the series of serrations remain outside the sleeve, never passing through the sleeve.

11 Claims, 12 Drawing Sheets

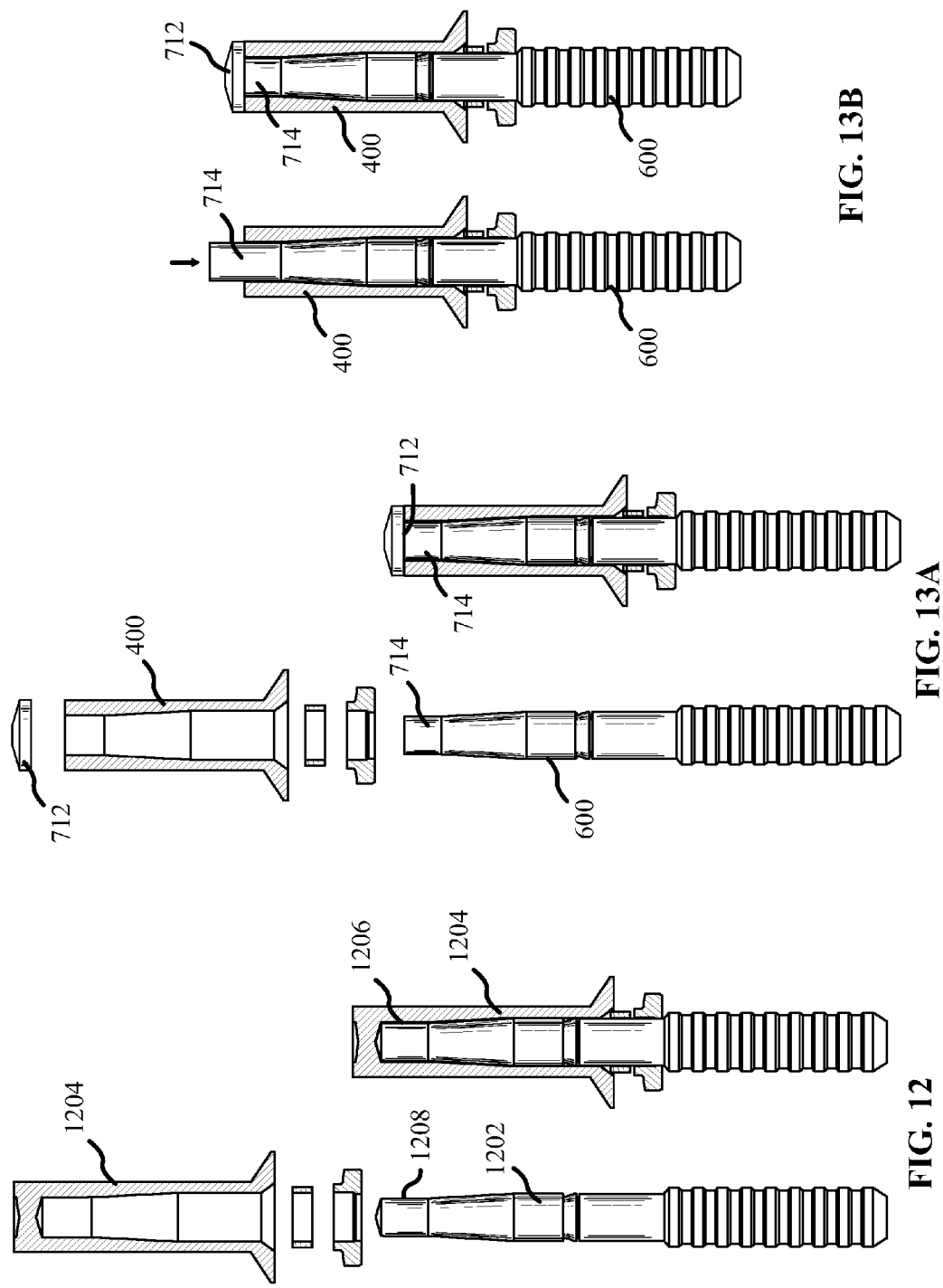

INTEGRATED PIN/SLEEVE BLIND FASTENER

CLAIM OF PRIORITY UNDER 35 U.S.C. §119

The present Application for Patent claims priority to U.S. Provisional Application No. 61/304,765 entitled "INTEGRATED PIN/SLEEVE BLIND FASTENER", filed Feb. 15, 2010 and is hereby expressly incorporated by reference herein.

FIELD

Various embodiments pertain to blind fasteners, including blind rivets and blind bolts, having features for accommodating grip variations, such as wiredraw, shear ring, and sleeve buckling type features.

BACKGROUND

In general, complex man-made structures, whether stationary such as buildings and bridges, or mobile such as moving vehicles operating on land, sea, air or space, are normally made from many components attached together forming a complex structure. The design of attachment points, commonly known as joints, requires special knowledge and skill for engineering design and analysis. A major part of this task is the selection of proper components, such as fasteners, for joining and fastening the structural components together.

The main purpose and primary objective in joint design is to facilitate the load transfer from one component of the structure to another component. The joined structure should be able to sustain the external and internal loads that may be experienced while performing its intended function. Loading may be in sustained static form or in a variable dynamic form. The functioning environment may be corrosive in nature, affecting the material properties and integrity of the fasteners and structural material. The operating environment may also undergo temperature changes affecting the load carrying characteristics of the joint and fasteners. All of these factors should be considered in joint design and fastener selection.

Since man's original venture into building structures and moving vehicles, many types of fasteners have been conceived, developed, and used successfully. However, with an ever developing civilization, the need for continuous improvement is always evident. One common feature in most joint designs is to create holes, or apertures, in the joint components, typically referred to as work pieces, to insert and attach the components to each other by placing a suitable fastener in the matching holes. These fasteners, referred to by many different names and terms, for example Blind Fasteners, are major contributors for constructing buildings, tools, vehicles, and other important structures comprising the present form of civilization and physical life.

With the demand for lightweight, high strength aerospace structural components, the usage of composite materials was necessitated. Composite materials are composed of at least two major components: load carrying fibers and a bonding matrix. The load carrying components are made from high strength fibers, such as carbon fibers, while the bonding matrix is normally made from nonmetallic materials, such as epoxy, having much less mechanical strength. Unlike homogenous metallic structures having ductility, the fibrous nature of composite material exhibits non-homogenous mechanical properties, thus complicating the process of efficient load transfer at mechanical joints. As is well known to those skilled in the art of fastening, efficient load transfer is accomplished when the structural material exhibits a certain degree of compliance and resiliency. Metallic structures normally exhibit resiliency and compliance, but the composite materials, lacking adequate ductility, are brittle in nature and are subject to unpredictable brittle type failure at the structural joint.

The brittle nature and the lack of resiliency of composite materials will often promote non-uniform distribution of loads to multiple fasteners installed in a single joint. The installation loads required for installing ordinary blind fasteners will often generate high levels of compressive stresses around the fastener holes of the structure. These compressive forces, when directly applied on composite structures, cause damage in the form of cracks, delamination, and fiber breakage, which adversely affects the load carrying capability of the structure, specifically around the holes in the structure. These types of damages and flaws need to be minimized.

The issue of proper distribution and sharing of the load between the fasteners and the structural components of the joints having multiple fasteners may be partially achieved by precision drilling for producing close tolerance holes and implementing a process of perfect hole alignment, such as precision match drilling of the holes. However, these solutions are expensive and difficult to achieve in practice. Another approach for addressing these issues is to utilize a hole-filling type fastener design. Composite structures, however, typically do not tolerate hole expansion readily, as excessive hole expansion tends to cause delamination and cracks in the structure. Therefore, while a fastener with hole-filling capability is desirable, a fastener design which creates excessive hole expansion in the structure needs to be avoided.

The Blind fasteners were invented to simplify the installation process and address the issues of restricted accessibility. The term "blind fastener" signifies the feature which allows the fastener to be installed from one side of the structure, thus accommodating for installation applications where only one side of the structure is accessible. As a result of being able to be installed from just one side of the structure, a single operator, with the aid of specialized tools, can install the fastener in the structure quickly and effectively, thus reducing installation costs, such as costs associated with labor. With these types of fasteners, proper formation of the blind side upset head is critical to the fastener performance. In particular, blind fasteners, when installed, are expected to form a well-defined upset head against the back sheet of a work piece within the expected grip range specified by the fastener design where "grip" is the thickness of the work piece, with the "grip range" being defined by the maximum grip and minimum grip specified for the specific fastener. A common value for the grip range is one-sixteenth (1/16) of an inch.

Many types of blind fasteners have been invented and are being used in significant numbers for attaching all types of structures, especially for attaching aerospace structural components where space and accessibility is restricted. Blind fasteners may be categorized based on their shear strength as design requirements for shear strength dictate whether the fastener is categorized (or known) as a Blind Rivet or a Blind Bolt. In the case of a Blind Rivet, typical shear strength is 50 ksi, or 50,000 pounds per square inch, which is sufficient enough to replace solid rivet applications, while in the case of a Blind Bolt, the shear strength is typically in excess of 90 ksi, which is sufficient to replace a typical nut and bolt application.

Design features related to the installation and grip accommodation method of the fastener determine whether the Blind Fastener is known as a Wiredraw Fastener (i.e., fastener pin elongates, due to a wire draw action within the sleeve), a Shear Ring Fastener (i.e., fastener pin utilizes a shear ring which breaks at a predetermined load), or a Variable Sleeve Hardness Fastener (i.e., fastener sleeve buckles onto the work piece). Blind fasteners, no matter which category they fall into, typically share many traits. Self-locking blind fasteners are normally comprised of a sleeve, a pin, and a lock collar. The sleeve may be comprised of an enlarged manufactured head of specific design, normally either a protruding head or flush head design. The pin may be designed with an enlarged preformed head and pin tail section, all designed to fit within the sleeve during assembly, and advanced to a predefined position by either a pulling motion or a turning procedure, during the installation process. After completion of the locking process, the tail portion of the pin may be broken off and discarded. A lock collar may be designed to retain the pin within the sleeve and secure the pin and sleeve together. By fitting and deforming the lock collar into cavities created upon the correct positioning of the pin within the sleeve, the installed fastener exhibits the expected strength requirements.

Currently, prior art Blind Fasteners require a preformed enlarged head to interact with the sleeve and form an upset head upon installation. These Blind Fasteners must therefore be assembled by passing the pin tail through the blind end of the sleeve. Thus, the diameter of the pin tail is limited by the internal diameter of the sleeve. As a result, the strength of the pin tail and pull force that can be applied during the installation process is limited by the size required for assembly.

Consequently, a new fastener design, which alleviates the problems inherent in conventional fasteners, is needed.

SUMMARY

One feature is directed to a blind fastener for securing one or more work pieces which have an open surface at a first side and a blind surface at a second side. The blind fastener includes a deformable sleeve and a pin, the pin having a main body section and a tail section. The main body section includes a shear load bearing section integrally connected to a lock collar engagement section on a first end and a pin stalk section on a second end, the pin stalk section integrally connected to a series of pin sleeve integrating grooves. The tail section is integrally connected between the main body, via a break notch, and a series of serrations. The deformable sleeve includes a hollow tubular shank having a first sleeve end and a second sleeve end, where the first sleeve end has a sleeve head having an opening for receiving the main body section of the pin. At all times during the assembly of the fastener, the series of serrations remain outside the opening of the deformable sleeve, never passing through the sleeve.

The hollow tubular shank comprises a first sleeve section integrally connected to the first sleeve end; a second sleeve section integrally connected to the first sleeve section; and a third sleeve section, integrally connected to the second sleeve section and the second sleeve end, having an internal surface for engaging the series of pin sleeve integrating grooves of the pin upon installation. The second sleeve section tapers inwardly from a first point to a second point, wherein the first point is integrally connected to the first sleeve section and wherein the second point is integrally connected to the third sleeve section.

Yet another feature provides for application of a load at the second sleeve end causing the second section to buckle downward and expand radially outward to form an upset head thereby creating a tight joint in an expected grip range of the blind fastener.

Yet another feature provides for the shear load bearing section having a diameter less than an inner diameter of the first sleeve section of the sleeve providing little or no frictional load upon installation of the blind fastener.

Yet another feature provides for an outer lower portion of the deformable sleeve, corresponding to the first sleeve section, having additional material which is forced radially inward, upon application of a force, into expansion ridges on the shear load bearing section providing a fastener hole-filling capability.

Yet another feature provides for the application of an assembly and integration load at the second sleeve section causing the internal surface of the third sleeve section to deform radially inward, engaging with the series of pin sleeve integrating grooves of the pin forming a permanent interlocking feature for securing the deformable sleeve and pin together.

Yet another feature provides for a cap secured to the second sleeve end for providing radial rigidity to prevent dilation of the second sleeve end as well as preventing fluids from passing through the interface of the sleeve and pin creating a self-sealing feature. As a result, accommodating for applications of corrosion preventing sealants commonly used in structural joints.

Yet another feature allows for integration of a sleeve of special design with a pin of special design such that in subsequent handling and installation processes, the pin and sleeve behave as a single component.

Yet another feature provides a sleeve having geometric design features that allows formation of a blind upset head in a predefined grip range of a work piece without the need of having variable sleeve strength.

Yet another feature provides for the adoption of several locking features fixing the pin and sleeve together, but due to integration features of the pin and sleeve, the pin and sleeve are engaged at each end after installation, thus providing improved mechanical properties.

Yet another features for a method for securing one or more work pieces, having an open surface at a first side and a blind surface at a second side, using a blind fastener. The method includes (i) inserting the blind fastener into a prepared aperture in the one or more work pieces, the blind fastener comprising a sleeve with a pin inserted therein, the pin having a main body section coupled to a tail section, having a series of serrations, via a break notch; (ii) positioning pulling jaws of an installation tool over the tail section, the pulling jaws engaging with the series of serrations and an end of the installation tool in contact with a washer fitted over the pin and abutting an end of the sleeve; (iii) applying a first axial pulling force on the pin while simultaneously applying a second axial pulling force on a lock collar, fitted over the pin, causing a portion of the sleeve to deform and spread radially outward creating an upset head in direct contact with a surface of the one or more work pieces; and (iv) separating the tail section of the from main body section of the pin by continually applying the first and second axial forces.

BRIEF DESCRIPTION OF THE DRAWINGS

Various features, nature and advantages may become apparent from the detailed description set forth below when taken in conjunction with the drawings in which like reference characters identify correspondingly throughout.

FIG. 12 illustrates side view assemblies of a pin and sleeve assembled with welding and/or chemical bonding, in accordance with an aspect of the present invention.

FIG. 13A illustrates a side view assembly of the fastener of FIG. 7B having a cap welded to an end of a portion of the pin protruding from the sleeve.

FIG. 13B illustrates a side view assembly of the fastener of FIG. 13A having a cap formed by pressing and deforming an end portion of the pin protruding from the sleeve.

DETAILED DESCRIPTION

In the following description numerous specific details are set forth in order to provide a thorough understanding of the invention. However, one skilled in the art would recognize that the invention might be practiced without these specific details. In other instances, well known methods, procedures, and/or components have not been described in detail, so as not to unnecessarily obscure aspects of the invention.

Wiredraw Fasteners

Figure 1:
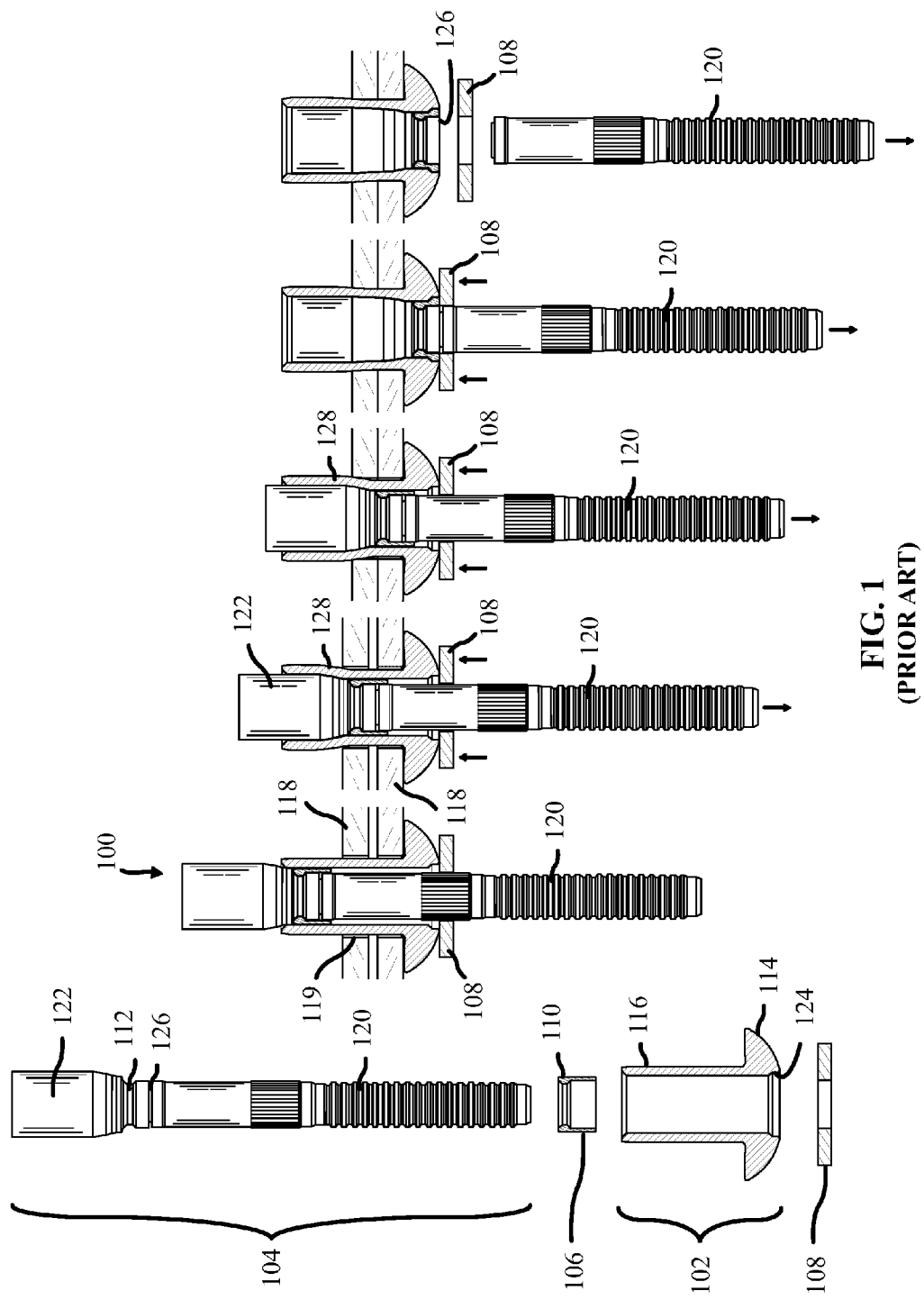
FIG. 1 illustrates a cross sectional view of typical wiredraw fastener during a typical installation sequence in a structure.

FIG. 1 illustrates a cross-sectional view of a typical wiredraw fastener 100, along with a schematic presentation of an installation sequence for the fastener. A wiredraw fastener 100 comprises a sleeve 102, a pin 104, a lock collar 106, and a washer 108. The pin 104 may include a disposable tail section 120 integrally connected to a pin head section 122 via a designated break notch 126.

To assemble the wiredraw fastener 100, the lock collar 106 may be inserted over the pin 104 such that the head 110 of the lock collar 106 is captured within a pin collar cavity 112 of the pin 104, where the cavity 112 is located at the base of the pin head section 122. The sleeve 102 includes an enlarged manufactured head 114, having a sleeve collar cavity 124, integrally connected to a sleeve shank 116, and is forced over the pin 104 and lock collar 106 so that the washer 108 may then be placed over the pin 104 completing the assembly process.

Once assembled, the fastener 100 can be installed in a structure 118 by inserting the assembled fastener 100 into a work hole 119 of the structure 118 and pulling the tail section 120 of the pin 104 axially, relative to the structure 118, using a standard pulling tool well known in the art. As the pin 104 is pulled through the sleeve 102, the pin head section 122, having a diameter larger than the diameter of the tail section 120 inserts itself into the smaller through hole diameter of the sleeve 102, radially deforming and expanding a portion 128 of the sleeve shank 116 protruding outside of the work hole 119, thus forming the upset head. When the base of the pin head 122 becomes substantially flush with the blind side of the work hole, radial expansion of the sleeve shank 116 within the work hole 119 of the work piece becomes limited to the size of the work hole 119. This increases the force required to pull the pin 104 axially, and as a result, increases the pressure exerted upon the pin head 122. This increased pressure on the pin head 122 causes the pin head 122 to elongate into the sleeve through hole. This elongation, known as wiredrawing, continues until the position of the pin 104 is properly located relative to the sleeve collar cavity 124 of the sleeve 102, such that the lock collar 106 can be deformed in place, securing the pin 104 and sleeve 102 together. As a result of this wiredraw effect, the fastener 100 can accommodate for its defined grip range. When the lock collar 106 is in place, further pulling on the tail section 120 no longer results in axial movement of the pin 104 relative to the sleeve 102 and work piece 118, but leads to the build up of stress in the pin 104 until the load is sufficient to break off the tail section 120 at the designated break notch 126, completing the installation process.

Shear Ring Fasteners

Figure 2:
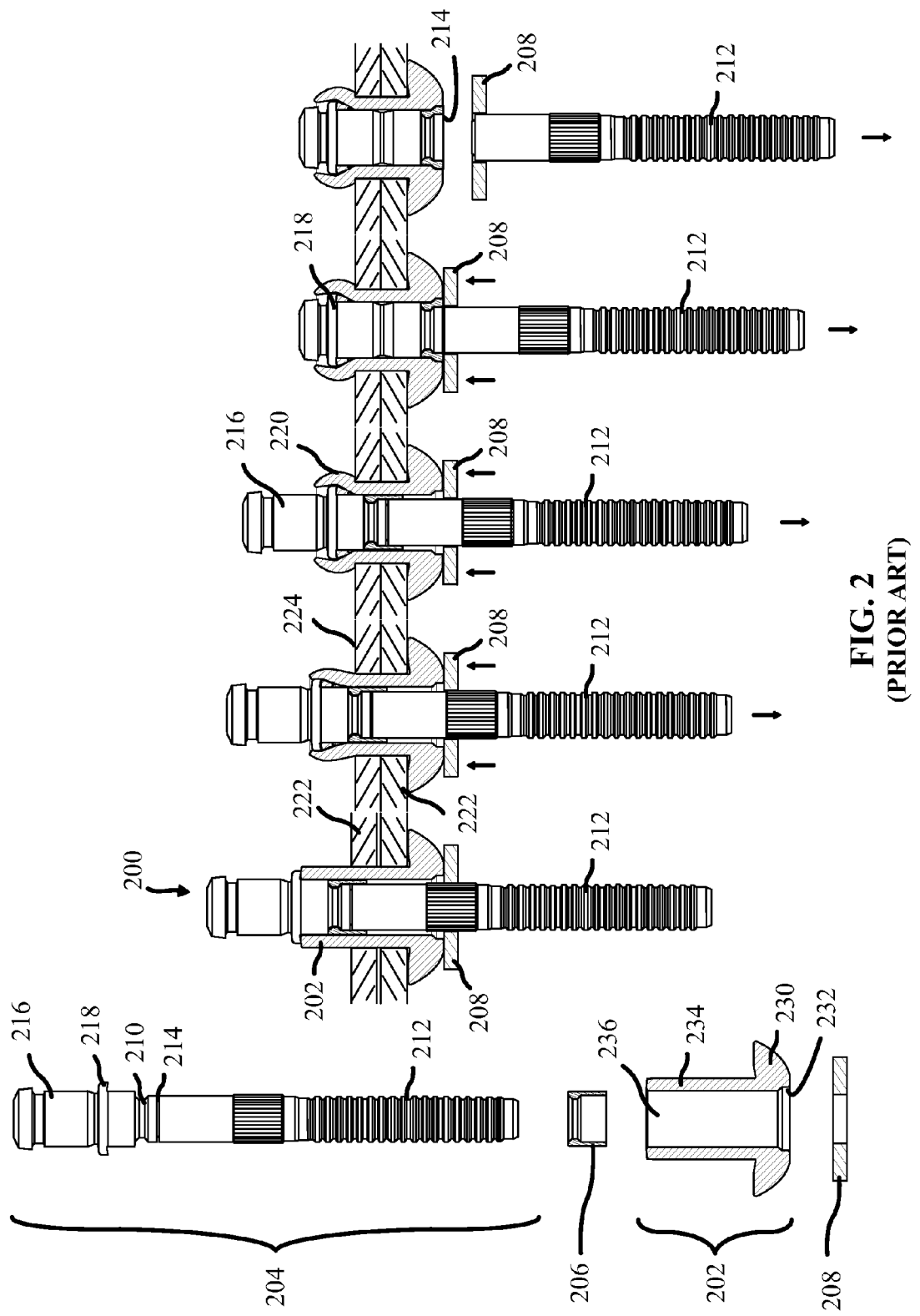
FIG. 2 illustrates a cross sectional view of a typical shear ring fastener during a typical installation sequence in a structure.

FIG. 2 illustrates a cross sectional view of a typical shear ring fastener 200, along with a schematic presentation of a typical installation sequence of the shear ring fastener. A shear ring fastener 200 comprises a sleeve 202, a pin 204, a lock collar 206, and a washer 208. The sleeve 202 includes a manufactured head 230, having a sleeve collar cavity 232, integrally connected to a straight sleeve shank 234, having a through hole 236. The lock collar 206 is designed to deform and fill cavities of the sleeve 202 and pin 204 and secure them in place. The washer 208 provides for the transfer of force to the lock collar 206 during the installation process that leads to its deformation.

The pin 204 may include a disposable tail section 212 integrally connected to a pin head section 216 via a designated break notch 214. The pin head section 216 includes a pin collar cavity 210 and a shear ring 218 formed and/or machined onto the pin having geometries larger in diameter than the diameter of the through hole 236 of the sleeve 202. The shear ring 218 is designed to shear from the pin head section 216 at a predefined load after radially deforming and expanding the blind side of the sleeve 202, creating a blind side upset head 220 to accommodate for work piece grip variation.

To install the shear ring fastener 200, it is inserted into a work hole of a structure 222 and the pin tail section 212 of the pin 204 is pulled axially, relative to the structure, using a standard pulling tool well known in the art. As the pin 204 is pulled axially, the shear ring 218, having a diameter larger than the diameter of the through hole 236 of the sleeve 202, is forced into the sleeve 202, thus radially expanding and deforming a portion of the sleeve shank 234 of the sleeve 202. As the blind side upset head 220 is forming and the shear ring 218 approaches the blind side 224 of the structure 222, the force necessary to continue forming the upset head greatly increases. Continued pulling of the disposable tail section 212 exerts enough force to shear the shear ring 218 from the pin head section 216 allowing the shear ring 218 to float on the pin head section 216, staying stationary in relation to the sleeve 202, for the remainder of the installation process.

Continued application of axial force F on the disposable pin tail section 212 allows the pin 204 to travel into a position such that the pin collar cavity 210 and sleeve collar cavity 232 of the sleeve 202 are aligned causing the lock collar 206 to deform, securing the sleeve 202 and pin 204 together. Continued application of axial force F on the pin results in the breaking of the pin 204 at the designated break notch 214, completing the installation process.

Variable Sleeve Hardness Fasteners

Figure 3A:
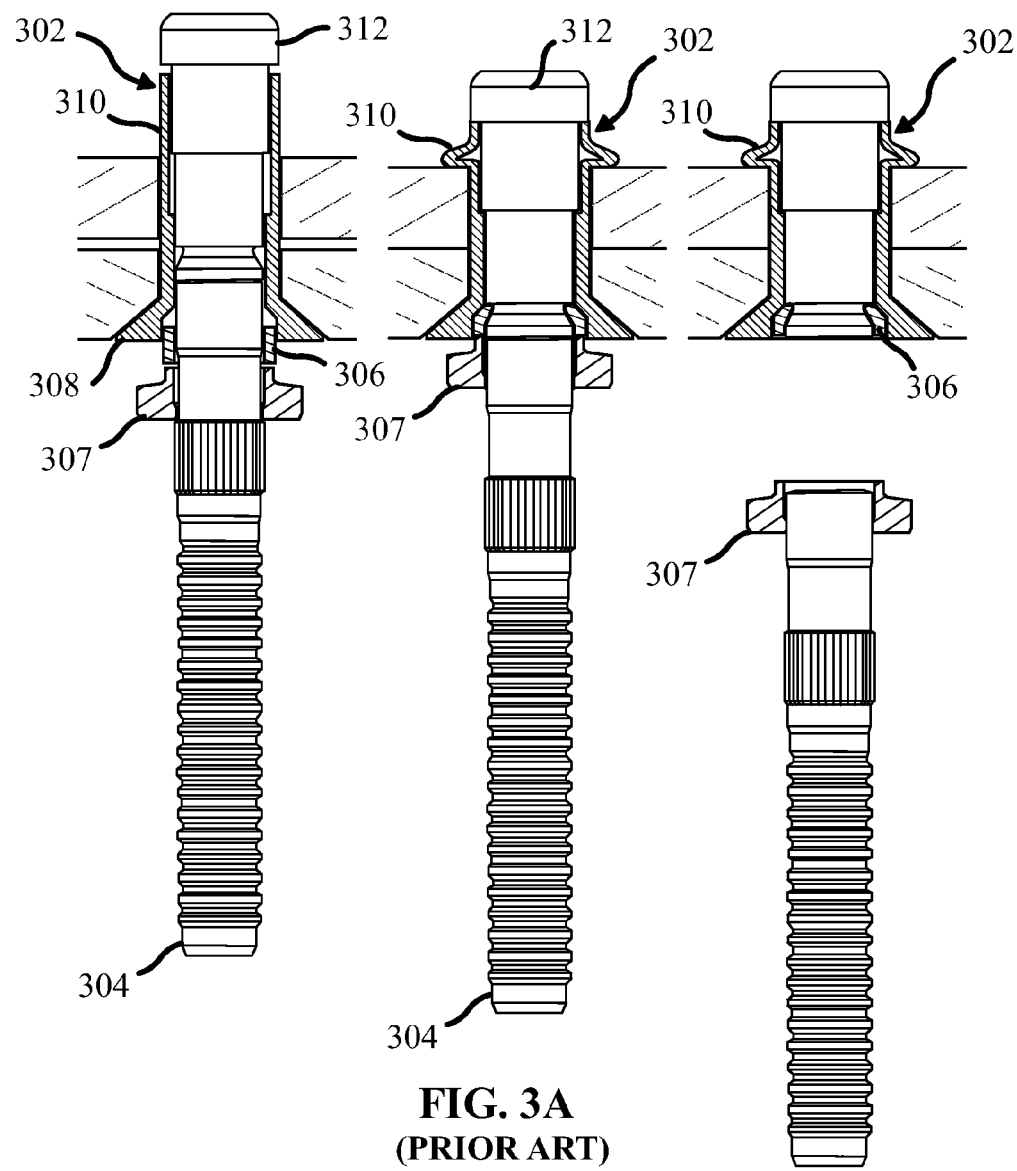
FIG. 3A illustrates cross sectional views of a typical blind bolt during a typical installation sequence in a structure.
Figure 3B:
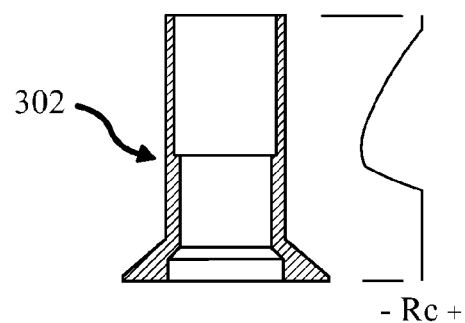
FIG. 3B illustrates a typical hardness profile of the blind bolt sleeve of FIG. 3A.

FIGS. 3A-3B illustrate cross sectional views of a typical blind bolt during a typical installation sequence and a typical hardness profile, respectively. A blind bolt generally comprises the components: a sleeve 302, a pin 304, and a lock collar 306. Optionally, the blind bolt may include a collar insertion tool 307. The sleeve 302 comprises an enlarged manufactured head 308 and a sleeve shank 310. The manufactured head 308 is of specific design, normally either protruding or flush design. The sleeve shank 310, which becomes deformed by the pin head 312, has been processed in such a way that it has an axially variable strength, as shown in FIG. 3B. Thus the deformable region of the sleeve 302 extending beyond the work piece, always has the softest portion adjacent to the work piece top surface.

The assembled fastener is placed into matching holes of the work piece and the pin 304 is pulled by a suitable installation tool. This allows the pin head 312, in contact with the sleeve 302, to apply compressive loads on the sleeve end, forming the blind side upset head in the soft exposed sleeve portion against the work piece.

After application of adequate load to complete the formation of the upset head, the internal step of the sleeve 302 interferes with the external step on the pin 304 creating interference forces which prevents further axial movement of the pin 304. The lock groove of the pin 304 and the internal dimple of the sleeve 302 are then aligned and the design is such that the volume of the cavity created is equivalent to the volume of the normally preassembled and integrated lock collar 306. The collar installation tool 307 is then used to force the lock collar 306 into the open cavity and create further resistance against axial movement of the pin 304, further increasing the pulling load applied by the installation tool, thus causing the pin 304 to break in the designated break notch area at a designated load. The broken pin tail is discarded, completing the installation process. However, several disadvantages exist when using blind bolts, such as lack of hole fill and difficulties in manufacturing, especially in the creation of the variable hardness curve, leading to scrap and unpredictability in the fastener.

Overview

In one aspect of the present invention, a fastener having a pin with a large diameter and strong disposable tail section alleviating the need for an enlarged pin head is provided. The geometry of the pin may be designed so that the pin and sleeve may be engaged and integrated together prior to installation during the assembly process of the fastener components. The engagement and integration process may join the pin and sleeve such that pulling the disposable pin tail section through the sleeve, using special tools, allows the integrated end portion of the sleeve and pin to remain engaged as the applied force is transferred directly to the sleeve end, upsetting the sleeve against the structure. A sleeve having either a variable sleeve wall thickness design or variable hardness feature may be used to accommodate the proper sleeve upset head formation in the expected grip range.

In yet another aspect of the present invention, the fasteners may provide controlled hole-filling capabilities for joining and fastening together work pieces that are made from relatively brittle materials, such as carbon fiber composite material.

In yet another aspect of the present invention, a series of fastener designs capable of providing sufficiently high shear and tensile strength to match the joint strength requirement of both metallic and composite materials, in addition to having adequate hole-filling capabilities to enhance fatigue properties of metallic structures, is provided.

In yet another aspect of the present invention, fasteners having a self-sealing capability for preventing fluids from passing between components of the fastener and the work piece when the fastener is installed in a work piece are provided.

In yet another aspect of the present invention, fasteners applied with corrosion preventive sealants and coatings, without affecting the installation behavior of the fasteners, are provided.

In yet another aspect of the present invention, fasteners formed of a combination of materials for outer sleeve and encapsulated inner pin, for satisfying the corrosion properties required of the fastened joints, are provided.

In yet another aspect of the present invention, the geometrical shape of the pin may assist in formation of the blind side upset head during the installation process of the fastener allowing for the required load for forming the upset head of the sleeve against the structure to be minimized and the upset head formation to be achieved without damaging the structure.

In yet another aspect of the present invention, fasteners for joining both metallic structures and non-metallic component structures are provided.

In yet another aspect of the present invention, a series of fasteners having design features which are simple to produce, rugged, dependable, economically desirable, as well as offering cost reduction and enhanced properties, is provided.

Exemplary Fastener

Figure 4:
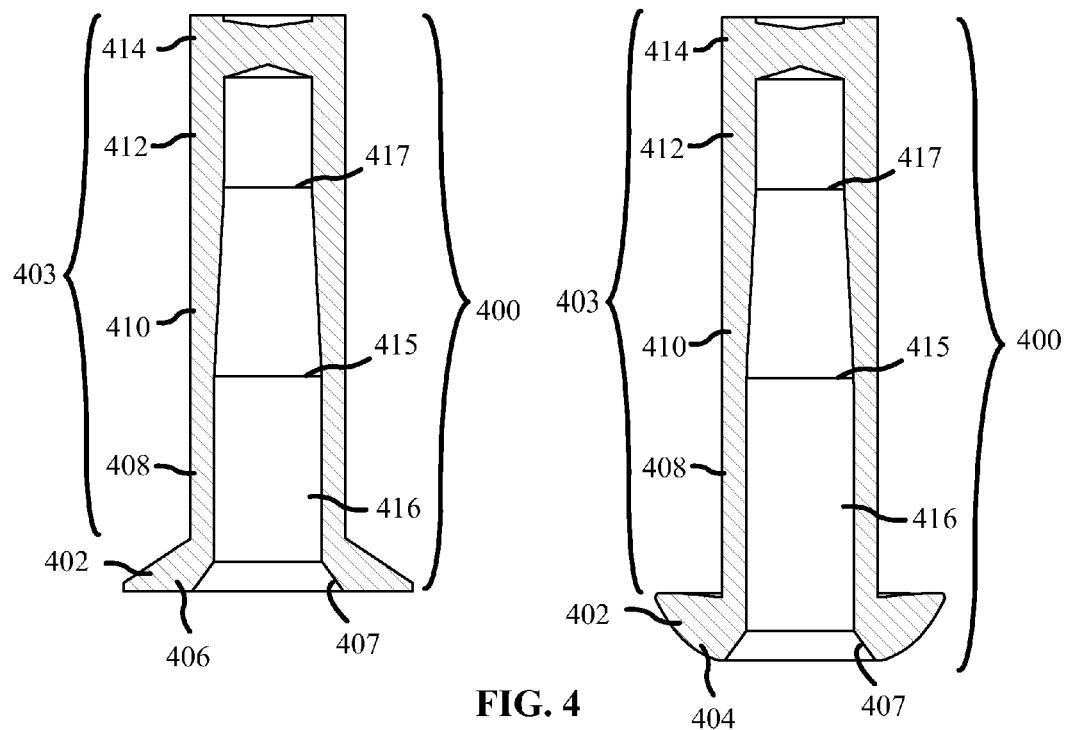
FIG. 4 illustrates side views of hollow tubular interlocking deformable sleeves, in accordance with an aspect of the present invention.
Figure 6:
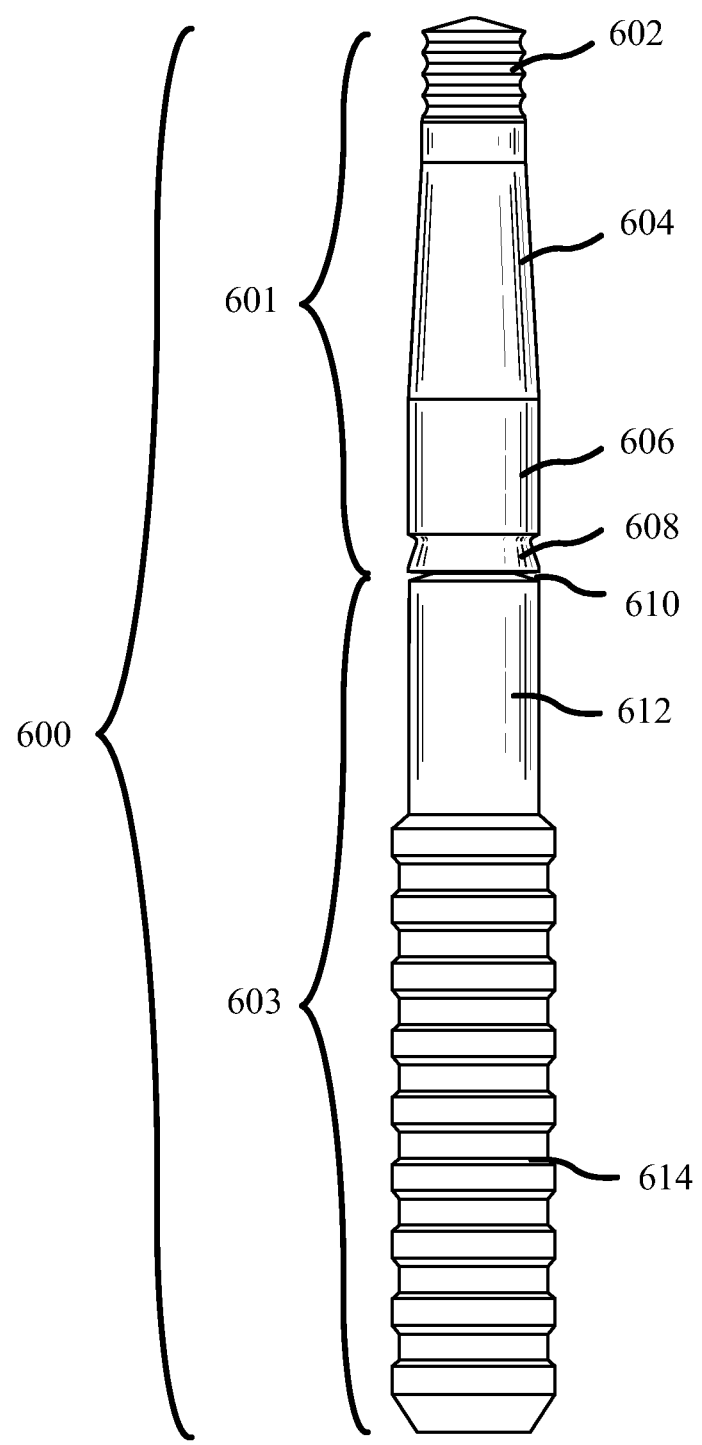
FIG. 6 illustrates a side view of a pin, in accordance with an aspect of the present invention.

According to various embodiments of the present invention, a modified Blind Fastener (or integrated pin/sleeve blind fastener) may include a sleeve as shown in FIG. 4, a pin as shown in FIG. 6, and a lock collar and a collar insertion tool as shown in FIG. 7.

Exemplary Sleeve

FIG. 4 illustrates side views of hollow tubular interlocking deformable sleeves 400, in accordance with an aspect of the present invention. As shown, an interlocking deformable sleeve 400 may include an elongated hollow cylindrical sleeve portion (or shank) 403 terminating at a first sleeve end in an enlarged preformed head 402. The enlarged preformed head may be in the form of, including but not limited to, an industry standard protruding head 404 (i.e. rounded ends) or a flush head 406 (i.e. flat across the entire surface). The sleeve head 402 may include a sleeve dimple 407 (or internal face or internal sleeve head surface) configured to accept a floating lock collar 706 (see FIG. 7).

The cylindrical sleeve portion 403 of the sleeve 400 may have an outer wall (or geometry) and an inner wall (or geometry) defining an opening 416 in the sleeve 400. Additionally, the cylindrical sleeve portion 403 may comprise a first sleeve (or straight) section 408, a second sleeve (or variable wall thickness) section 410 and a third sleeve (or sleeve-pin engagement) section 412.

The first sleeve section 408 may be of uniform diameter such that the outer wall of the first sleeve section 408 is straight and at a 90° angle relative to the flat surface of the outer top surface 404 of the preformed head 402. The second sleeve section 410 may be of variable internal diameter such that the second sleeve section 410 tapers or reduces inwardly, either lineally or nonlinearly from a first point 415 to a second point 417, where the first point 415 may be integrally connected to the first sleeve section 408 and the second point 417 may be integrally connected to the third sleeve section 412. In one aspect, the largest internal diameter of the second sleeve section 410 may be equal to the internal diameter of the first sleeve section 408 and the smallest internal diameter of the second sleeve section 410 may be equal to the internal diameter of the third sleeve section 412.

According to one aspect, the sleeve 400 may include an integrated cap 414 to prevent fluids from passing between fastener components when the fastener is installed, while enhancing the proper formation of the blind side upset head by helping to prevent sleeve dilation and disengagement between the pin and sleeve during installation. The overall external geometry of the cylindrical sleeve portion 403 may be cylindrical throughout the length, or it may vary in specific geometrical design (see FIGS. 11A-11B), as the performance and function of the fastener demands.

Figure 5:
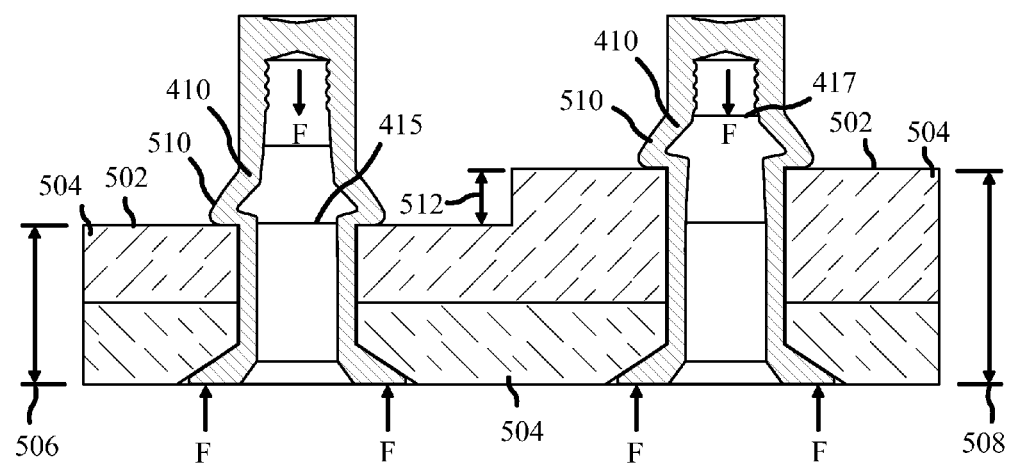
FIG. 5 illustrates the sleeve of FIG. 4 being upset flush to a surface of a structure having varying thickness, in accordance with an aspect of the present invention.

The first (or straight) section 408 may function as a longitudinal spacer, acting to position the second (or variable wall thickness) section 410 in the proper position relative to a work piece, based upon the design stack up or grip of the work piece (see FIG. 5). The first (or straight) section 408 may also radially fill the hole of the work piece in certain embodiments of the design, as described in further detail below with reference to FIGS. 11A-11C, depending on the requirements and applications of the fastener.

The second (or variable wall thickness) section 410 may allow for the sleeve 400 to accommodate installation in a specified grip range of the work piece by creating a point of buckling nearest to the blind side surface 502 of the work piece 504 (see FIG. 5), eliminating the need for varying the sleeve material hardness and strength, prevalent in prior art, to accomplish similar functions, as shown in FIG. 3B. The geometry of the variable wall thickness section 410, may be tapered, curvilinear, internal, or external, or any combination of these geometries, so that the sleeve may deform properly during installation.

The third (or sleeve-pin engagement) section 412 may interact and engage with pin-sleeve integrating grooves 602 of a pin 600 (see FIG. 6) providing interlocking strength capable to exert an axial force "F" (see FIG. 5) to buckle the sleeve 400 upon the relative movement of the pin to the sleeve 400 during the installation process.

The integrated cap 414 may also provide radial rigidity to prevent dilation of the sleeve end due to the application of installation forces as well as providing a self-sealing feature for the installed fastener, preventing leakage of fluids through the interface 704 (see FIG. 7) of the pin 600 outer diameter and sleeve inner diameter, or aperture 416. Additionally, the integrated cap 414 may accommodate the application of corrosion protective sealant often used on the inner wall of the work piece holes and the outside surfaces of the fastener sleeve 400 prior to installation providing a barrier type coating for preventing galvanic corrosion caused by contact of dissimilar materials.

FIG. 5 illustrates the sleeve 400 of FIG. 4 being upset flush to a surface 502 of a structure or work piece 504 having varying thickness. The structure or work piece 504 may have an open surface at a first side and a blind surface at a second side. As shown, the first point 415 separating the first sleeve section 408 from the second sleeve section 410 may be located at or near a minimum grip length 506, while the second point 417 may exist well above a maximum grip length 508 for the intended application. That is, each fastener may have predefined minimum and maximum values for thickness of material, or material stack up, for which it can be properly installed. This is known as the grip range 512 and is typically 0.062", but can vary by fastener family. That is, the difference between the minimum grip 506 and the maximum grip 508 may be 0.062". As a result, a family of fasteners, i.e. fasteners of the same design but of different lengths and/or diameters, can cover a wide range of thicknesses and hole diameters to be installed into. The second sleeve section 410 may be designed such that upon application of an installation load "F" on the sleeve 400, the second sleeve section 410 may buckle downward, expanding radially outward to form an upset head 510 in an intended grip range 512, on the blind side surface 502 at the second side of the work piece 504, and exerts an axially downward load against the surface 502 of the work piece 504.

Exemplary Pin

FIG. 6 illustrates a design of a pin 600, in accordance with an aspect of the present invention. The pin 600 may include a main body portion 601 and a tail portion 603 separated by a break notch 610 which is designed to separate the tail portion 603 from the main body portion 601 when the appropriate force is applied. As shown in FIG. 6, the main body portion 601 may include a shear load bearing zone 606 integrally connected to a lock collar engagement section 608 on a first end and a pin stalk section 604 on a second end. The pin stalk section 604 may be integrally connected to a series of pin sleeve integrating grooves 602. The tail portion 603 may include a lock collar and insertion tool assembly location section 612 integrally connected to a series of serrations (or grooves or threads) 614 at a first end, and the pin break notch 610 on a second end.

Figure 7A:
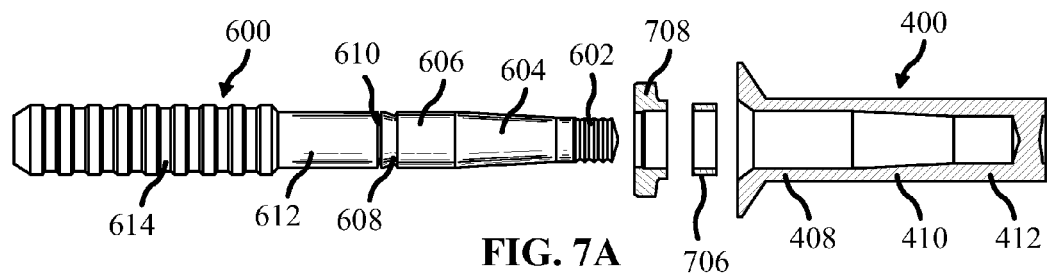
FIG. 7A illustrates an exploded view of a fastener prior to assembly and integration, in accordance with an aspect of the present invention.
Figure 7B:
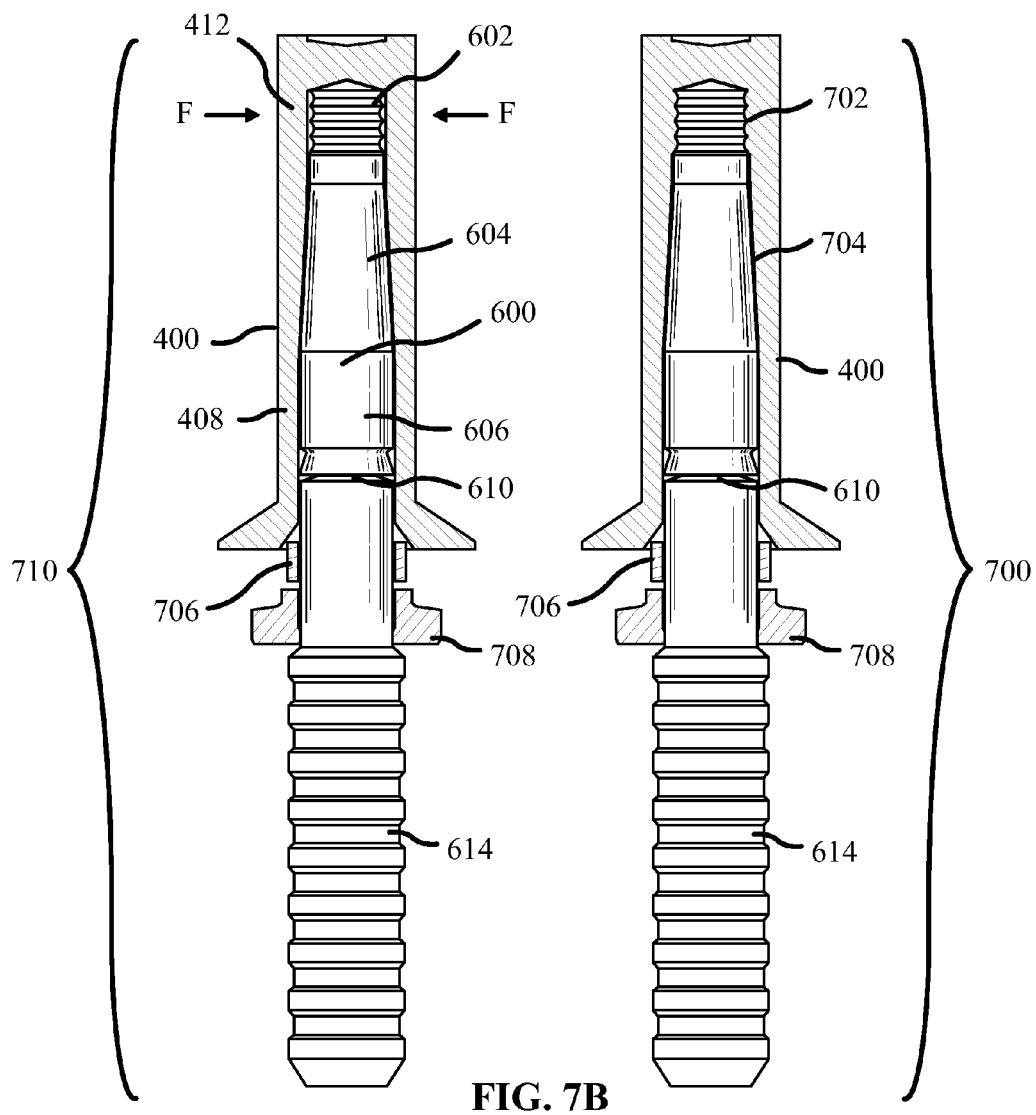
FIG. 7B illustrates a side view of a fastener assembly and integration process, in accordance with an aspect of the present invention.

The pin-sleeve integrating grooves 602 may engage and integrate with the sleeve-pin engagement section 412 of the sleeve 400, during the assembly and integration of the fastener, as shown in FIG. 7B. The size, shape, and geometry of the pin-sleeve integrating grooves 602 may be such that, upon engagement with the sleeve 400, enough interlocking strength may be provided between the pin 600 and the sleeve 400 to accommodate the installation process of the fastener into a work piece (see FIG. 8).

The pin-stalk section 604 may function to properly position the pin-sleeve integration grooves 602 within the sleeve 400 in relation to the rest of the pin 600. Depending upon the desired design and function of the fastener, the pin stalk section 604 may substantially or completely match the inner geometry of the second (or variable wall thickness) section 410 of the sleeve 400, which may in turn function to aid in the formation of the upset head 510 against the work piece during the installation process.

The shear load bearing zone 606 may be sized for insertion into the aperture 416 of the sleeve 400, and in conjunction with the first (or sleeve straight) section 408, to withstand the required minimum shear load needed. Furthermore, the shear load bearing zone 606 may be positioned such that, upon installation of the fastener in joining work pieces, it is located in the shear plane of the work pieces. Additionally, the shear load bearing zone 606 may be sized and shaped so that the diameter of the shear load bearing zone 606 is slightly undersized as compared to the inner diameter of the first (or straight) section 408 of the sleeve 400, such that it provides little to no frictional load upon installation. Alternatively, it may be desirable for the shear load bearing zone 606 to be oversized in comparison to the inner diameter of the first section 408, to provide an interference fit. This may or may not be in conjunction with optional expansion ridges 1107 located in the shear load bearing zone to provide a measurable hole-filling property. (See FIG. 11B)

Figure 8:
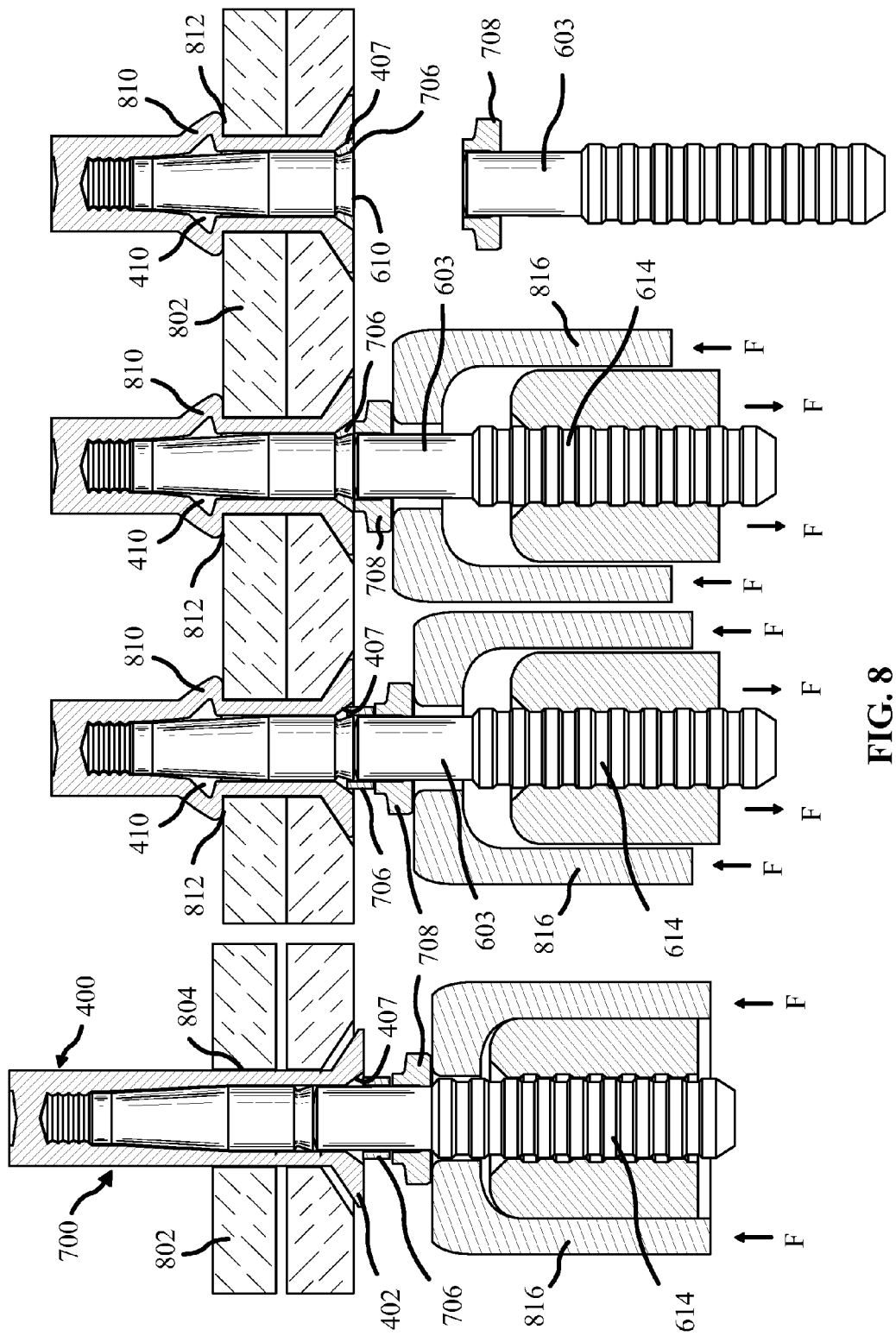
FIG. 8 illustrates the process of an assembled and integrated fastener securing a work piece, or structure of minimum grip, in accordance with an aspect of the present invention.
Figure 10:
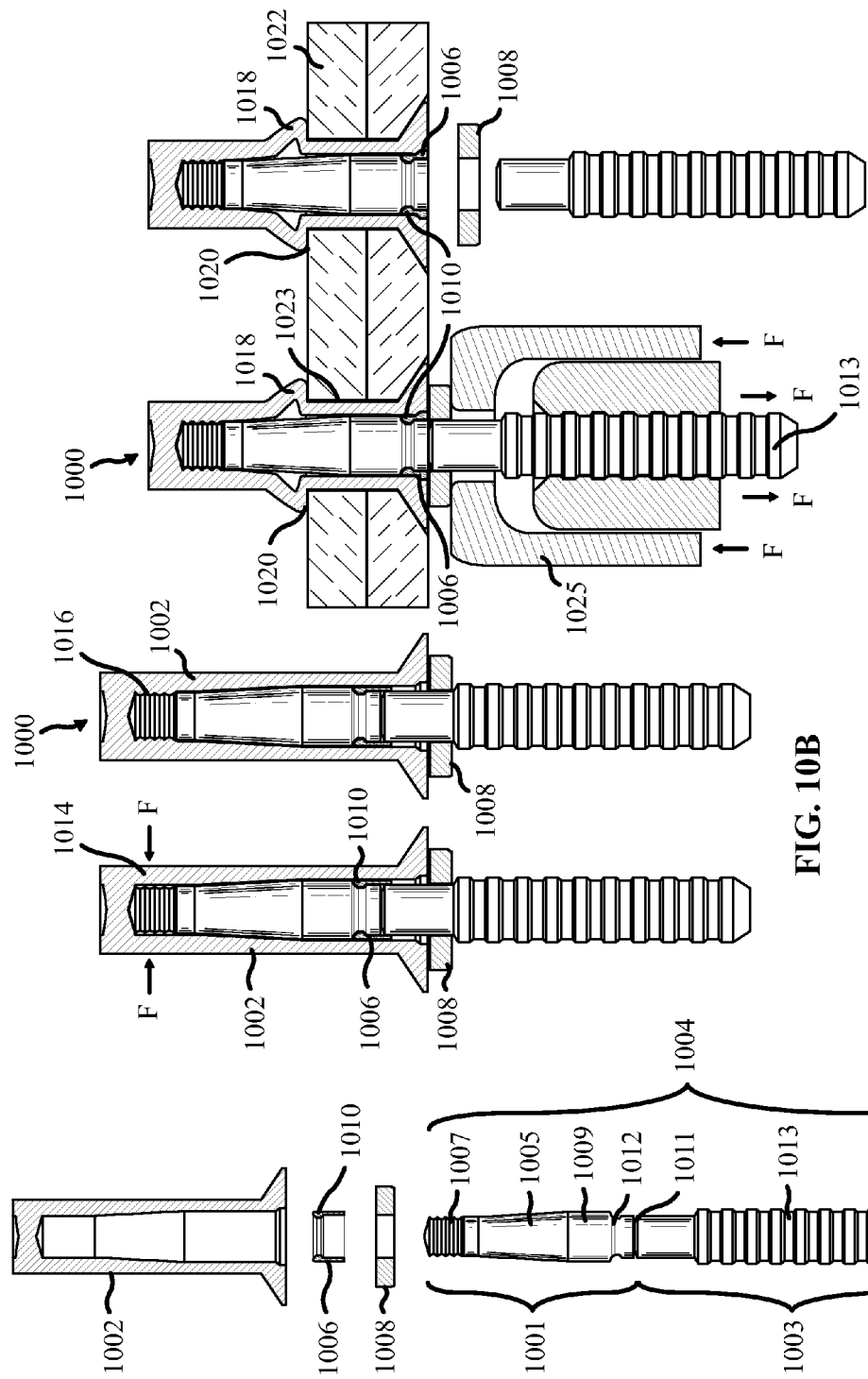
FIG. 10A illustrates an exploded view of a fastener using a riding type lock collar, in accordance with an aspect of the present invention.
FIG. 10B illustrates side view of the assembled and integrated fastener of FIG. 10A.
FIG. 10C illustrates the process of an assembled and integrated fastener securing a work piece, or structure, in accordance with an aspect of the present invention.

As described above, the shear load bearing zone 606 may be integrally connected to the lock collar engagement section 608, which may take one of many geometries similar to conventional designs, depending upon the geometry of the lock collar employed. This lock collar engagement section may be sized and shaped to accept a floating type lock collar 706, as seen in FIG. 8, or a riding type lock collar 1006, as seen in FIG. 10. The lock collar engagement section 608 may be employed to lock the pin 600 in place relative to the sleeve 400 upon installation of the fastener by way of inserting, capturing, and securing the lock collar 706 between the pin and sleeve.

The break notch 610 may be designed such that when the proper amount of pulling load is applied to the pin tail portion 603, the pin tail portion 603 would separate at the break notch 610, positioning the pin break notch 610 flush with the top of the sleeve 400 upon completion of the installation process.

The series of serrations (or grooves or threads) 614 on the pin tail portion 603 may interact with the installation tool to pull the fastener into an installed position, during the installation process. After installation of the fastener, the pin tail portion 603 may break away from the main body 601 and be discarded.

In prior art fastener designs, the maximum diameter of the serrations 614 on the tail portion 603 would be limited by the inner diameter of the sleeve 400, as during assembly process of standard Blind Fasteners, the pin tail section 603 must pass through the inside of the sleeve (see FIG. 1-3). However, during the assembly of the fastener of the present invention, as shown in FIGS. 7A-7B, the pin tail portion 603 does not pass through the sleeve 400 and as a result, this limitation does not exist.

Exemplary Fastener Assembly and Integration Process

During the fastener assembly process, the pin 600 and sleeve 400 may be deformed such that the sleeve-pin engagement section 412 may be integrated with the pin-sleeve integrating grooves 602. A process, such as a rolling operation, may be utilized to form the sleeve to the pin, ensure the proper engagement is made between the sleeve and pin, and to form the sleeve component to the desired external geometric sizes. A rolling operation, as known in the art, is a process which involves passing the assembled pin and sleeve through a set of rolling dies. Alternatively, it may also be feasible to employ a compressive process to radially deform the sleeve over the pin, to complete the engagement and interlocking process.

FIG. 7A illustrates an exploded view of a fastener prior to assembly and integration, in accordance with one aspect of the present invention. FIG. 7B illustrates a side view of a fastener assembly and integration process, in accordance with an aspect of the present invention. According to one aspect, the integration of the sleeve 400 and the pin 600 may be combined with the assembly process of incorporating other components of the fastener, including, but not limited to, a lock collar, a washer and a shear washer which may be incorporated into the fastener depending on the intended use of the fastener. Various methods, as known in the art, may be used for performing the integration and assembly process. The method utilized may be determined based on manufacturing demands and limitations.

In one embodiment, the fastener 700 may be initially assembled by inserting the pin 600 into the through hole of a collar installation tool 708, if applicable, and positioning the lock collar 706 as required by the style of lock collar employed, as described below in further detail. The sleeve 400 may then be positioned on the pin 600 to form a preassembled unit 710. Next, the components may be aligned such that an inward radial force F may be applied to deform and integrate the pin 600 and sleeve 400 firmly together. That is, application of the inward radial force F may cause the sleeve material from the sleeve-pin engagement section 412 of the sleeve 400 to be pressed radially inward into the pin-sleeve integrating grooves 602 of the pin 600 creating a permanent interlocked section 702 between the sleeve-pin engagement section 412 and the pin-sleeve integration grooves 602.

This process, known as a roll forming process, may also be employed to form the pulling serrations 614 on the disposable pin tail portion 603 (see FIG. 6). Upon completion of this roll forming process, the sleeve 400 should exhibit the desirable outer diameter geometry per the requirements of the design. Thus, the assembled fastener is now complete.

Exemplary Fastener Installation

FIG. 8 illustrates the process of an assembled and integrated fastener 700 securing a work piece, or structure 802 of minimum grip, in accordance with an aspect of the present invention. As shown, the assembled fastener 700 may be placed in a prepared aperture 804 in the work piece, or structure 802. The prepared aperture 804 may be of a specific geometry such that it corresponds with the size and shape of the assembled fastener 700. An installation tool 816 containing pulling jaws, may be positioned over the pin tail portion 603 such that the jaws engage with the pin tail serrations 614 and the end of the installation tool 816 is in contact with the collar installation tool 708 of the assembled fastener 700. The installation tool 816 is designed to apply the axial pulling force F on the pin 600, while simultaneously applying an equal force F on the lock collar 706 and/or sleeve enlarged preformed head 402. As the forces F are applied, the sleeve 400 may deform at the second sleeve section 410 due to the axial motion of the pin 600 which in turn may cause the second sleeve section 410 to spread radially outward, while collapsing itself such that the upset head 810 created is in direct contact with the surface 812 of the work piece, or structure 802.

Continued application of the axial force F on the lock collar 706 may act to insert and deform the lock collar 706 into the cavities of the sleeve dimple 407 and the lock collar engagement section 608, integrally locking the pin and sleeve together. Further application of the axial pulling force F may cause the pin 600 to break at the break notch 610 separating the pin tail portion 603 and the collar installation tool 708 from the installed fastener, completing the installation process.

Figure 9:
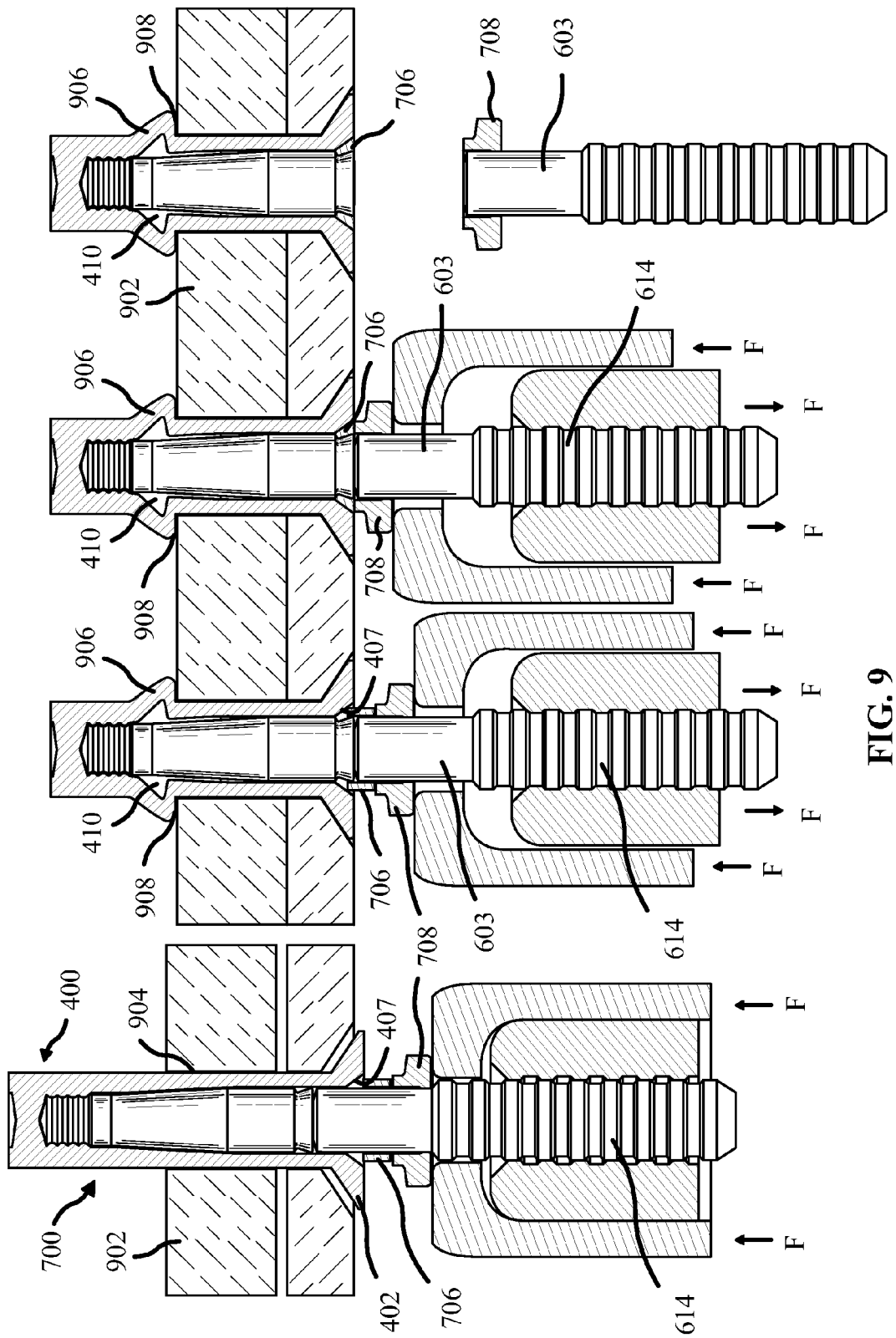
FIG. 9 illustrates the process of an assembled and integrated fastener securing a work piece, or structure of maximum grip, in accordance with an aspect of the present invention.

FIG. 9 illustrates the process of an assembled and integrated fastener 700 securing a work piece, or structure 902 of maximum grip in accordance with an aspect of the present invention. Similar to FIG. 8, the fastener 700 may be placed in a prepared aperture 904 in the work piece, or structure 902. As the forces F are applied, the sleeve 400 may deform at the second sleeve section 410 due to the axial motion of the pin 600 which in turn may cause the second sleeve section 410 to spread radially outward, while collapsing itself such that an upset head 906 is created in direct contact with the surface 908 of the work piece, or structure 902.

Riding type Collar

Depending on the structural requirements and functional demands of the fastener, a combination of lock collar and collar insertion tools may be employed. FIGS. 4-9 illustrate a fastener design for a floating type lock collar 706. During the fastener installation process (see FIG. 8), a floating type lock collar 706 may float on the pin 600 with no relative motion to the structure 802, as the pin 600 travels axially.

FIG. 10A illustrates an exploded view of a fastener 1000 using a riding type lock collar, in accordance with an aspect of the present invention. The fastener 1000 may comprise a sleeve 1002, a pin 1004, a riding type lock collar 1006 and a washer 1008. The pin 1004 may include a main body portion 1001 and a break-away pin tail section 1003 separated by a break notch 1011 which is designed to separate the break-away pin tail section 1003 from the main body portion 1001 when the appropriate force is applied. As shown in FIG. 10A, the main body portion 1001 may include a shear load bearing zone 1009 integrally connected to a cavity 1012 on a first end and a pin stalk section 1005 on a second end. The pin stalk section 1005 may be integrally connected to a series of pin sleeve integrating grooves 1007 while the break-away pin tail section 1003 may include a lock collar and insertion tool assembly location section integrally connected to a series of serrations (or grooves or threads) 1013 at a first end and the pin break notch on a second end.

FIG. 10B illustrates side view of the assembled fastener of FIG. 10A. The fastener 1000 may be assembled by placing and fitting the riding type lock collar 1006 over the pin 1004 such that the head of the lock collar 1010 is captured within the cavity 1012 of the pin 1004. The sleeve 1002 may then be forced over the pin 1004 and riding type lock collar 1006, optionally preceded by a washer type collar installation tool 1008. A radial inward force F may then be applied to the sleeve 1002 at a sleeve-pin engagement section 1014, creating a permanent interlocking section 1016 by integrating the sleeve 1002 and pin 1004 and completing the fastener assembly and integration process.

FIG. 10C illustrates the process of an assembled and integrated fastener 1000 securing a work piece, or structure 1022 in accordance with an aspect of the present invention. As shown, the assembled fastener 1000 may be placed in a prepared aperture 1023 in the work piece, or structure 1022. The prepared aperture 1023 may be of a specific geometry such that it corresponds with the size and shape of the assembled fastener 1000. An installation tool 1025 containing pulling jaws, may be positioned over the break-away pin tail section 1003 such that the jaws engage with the pin tail serrations 1013 and the end of the installation tool 1025 is in contact with the washer type collar installation tool 1008 of the assembled fastener 1000. The installation tool 1025 may be designed to apply the axial pulling force F on the pin 1004, while simultaneously applying an equal force F on the riding type lock collar 1006 and/or sleeve enlarged preformed head. During the fastener installation process, the riding type lock collar 1006 rides the pin 1004, moving axially in conjunction when the installation force F is applied to the break-away pin tail section 1003.

As the forces F are applied, the sleeve 1002 may deform at a second sleeve section due to the axial motion of the pin 1004 which in turn may cause the second sleeve section to spread radially outward, while collapsing itself such that an upset head 1018 is created is in direct contact with the surface 1020 of the work piece, or structure 1022. Further application of the axial pulling force F may cause the pin 1004 to break at the break notch 1011 separating the break-away pin tail section 1003 from the installed fastener, completing the installation process.

Hole Filling Fastener

In the case of composite structures, it may be important to adopt a fastener design concept that ensures a limited but adequate hole filling feature. The conceptual design and the novel innovations presented herein provide such a feature. The basic design for achieving a hole filling property may be incorporated within the pin and sleeve designs.

Figure 11:
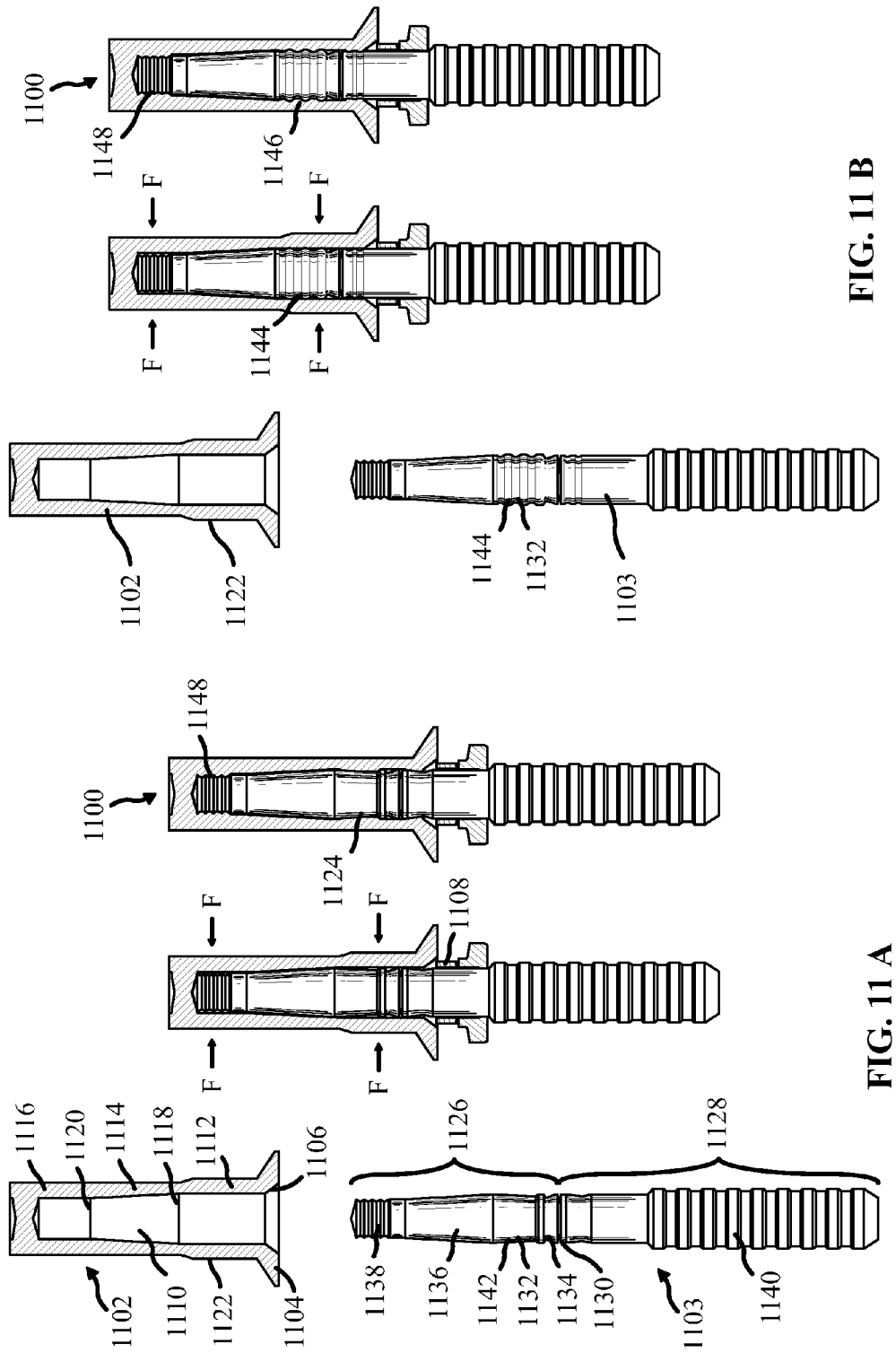
FIGS. 11A-11B illustrate side views of a hole filling type fastener assembly and integration process, in accordance with an aspect of the present invention.
FIG. 11C illustrates side views of a hole filling fastener securing a structure, in accordance with an aspect of the present invention.
Figure 11:
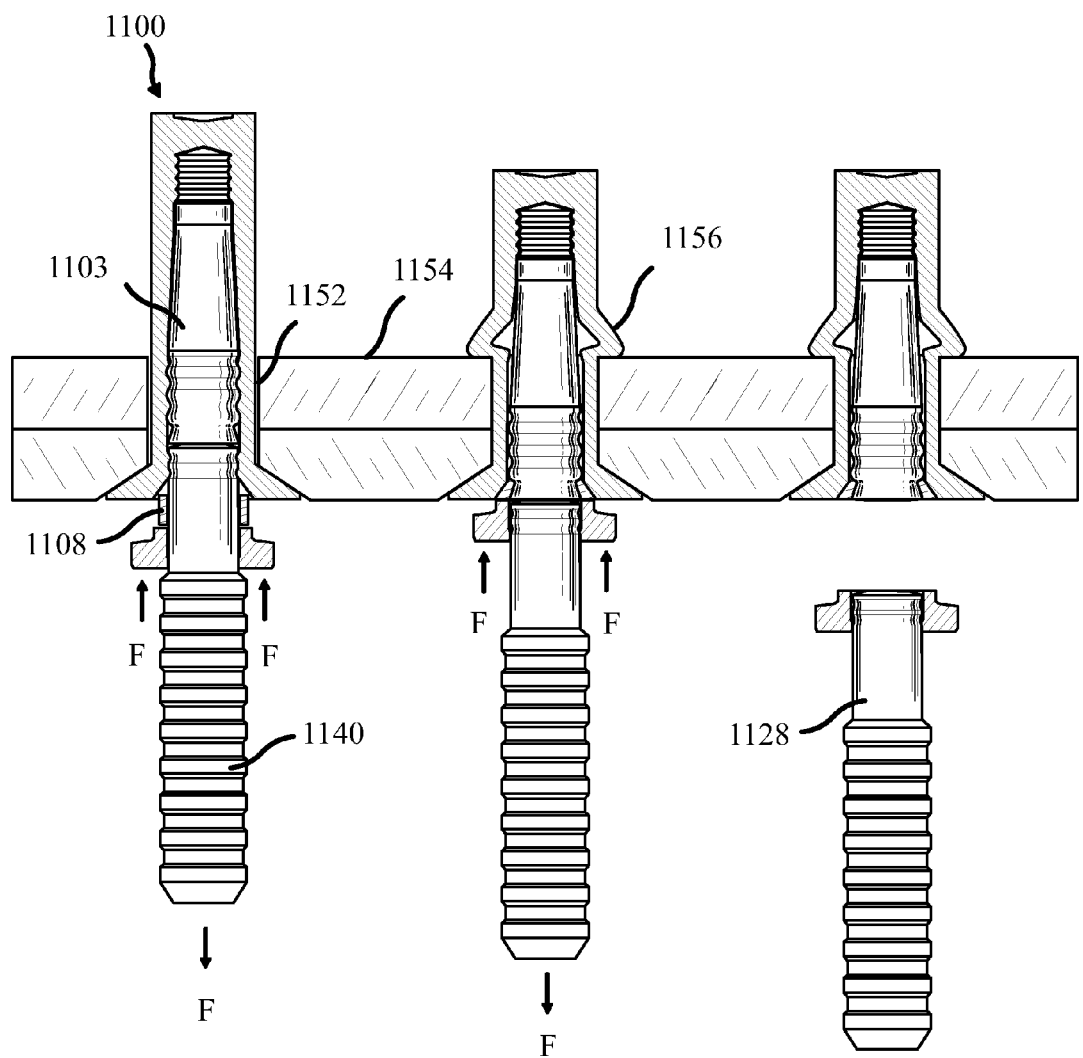

FIGS. 11A-11B illustrate side views of a hole filling type fastener assembly and integration process, in accordance with an aspect of the present invention. As shown, the fastener 1100 may include a hollow tubular interlocking deformable expander sleeve 1102 and an expander pin 1103.

As shown, the expander sleeve 1102 may include an elongated hollow cylindrical sleeve portion (or shank) terminating at a first sleeve end in an enlarged preformed head 1104. The sleeve head 1104 may include a sleeve dimple 1106 configured to accept a lock collar 1108 when the pin 1103 is locked in place relative to the sleeve 1102 upon installation of the fastener into a work piece.

The cylindrical sleeve portion of the sleeve 1102 may have an outer wall (or geometry) and an inner wall (or geometry) defining an opening 1110 in the sleeve 1102. Additionally, the cylindrical sleeve portion may comprise a first sleeve section 1112, a second sleeve section 1114 and a third sleeve section 1116. The first sleeve section 1112 may be of uniform diameter such that the outer wall (or geometry) of the first sleeve section 1112 is straight and at a 90° angle relative to the flat surface of the outer top surface of the preformed head 1104. The second sleeve section 1114 may be of variable diameter such that the second sleeve section 1114 tapers, or reduces inwardly, either lineally or nonlinearly from a first point 1118 to a second point 1120, the first point 1118 may be integrally connected to the first sleeve section 1112 and the second point 1120 may be integrally connected to the third sleeve section 1116. In one aspect, the largest inner diameter of the second sleeve section 1114 may be equal to the inner diameter of the first sleeve section 1112 and the smallest inner diameter of the second sleeve section 1114 may be equal to the inner diameter of the third sleeve section 1116.

An outer lower portion of the expander sleeve 1102, corresponding to the first sleeve section 1112, may include additional material 1122. During the fastener assembly and integration process, the additional material 1122 may be forced radially inward creating an internal geometry 1124 to interact with the expander pin 1103 during installation.

The expander pin 1103 may include a main body portion 1126 and a tail portion 1128 separated by a break notch 1130 which is designed to separate the tail portion 1128 from the main body portion 1126 when the appropriate force is applied. The main body portion 1126 may include a shear load bearing zone 1132 integrally connected to a lock collar engagement section 1134 on a first end and a pin stalk section 1136 on a second end. The pin stalk section 1136 may be integrally connected to a series of pin sleeve integrating grooves 1138 while the break-away tail portion 1128 may include a lock collar and insertion tool assembly location section integrally connected a series of serrations (or grooves or threads) 1140.

According to one embodiment, the expander pin 1104 may contain external expander geometry 1142 having a tapered design which may or may not be limited to the shear load bearing section of the pin. (see FIG. 11A) Alternatively, the external expander geometry may have a curvilinear design, or concentric knurls 1144, or combination thereof, such that the during the fastener assembly and integration process, this external expander geometry 1142 may accept the sleeve extra material 1122 and allows it to form into the sleeve internal geometry 1146. (see FIG. 11B)

Upon insertion of the pin 1102 into the sleeve 1103, during assembly of the fastener, the pin-sleeve integrating grooves 1138 may engage with the third section 1116 of the sleeve 1102, creating a permanent interlocked section 1148 upon the application of an inward radial force F. The size, shape, and geometry of the pin-sleeve integrating grooves 1138 may be such that, upon engagement with the sleeve 1102, enough interlocking strength may be provided between the pin 1103 and the sleeve 1102 to transfer the installation load to the sleeve 1102 as the pin 1103 is being engaged and pulled axially by an installation tool (not shown) during the installation process of the fastener into a work piece (see FIG. 11C).

FIG. 11C illustrates side views of a hole filling fastener securing a work piece or structure, in accordance with an aspect of the present invention. Similar to FIGS. 8-10, the assembled fastener 1100 may be placed in a prepared aperture 1152 in a work piece, or structure 1154. The prepared aperture 1152 may be of a specific geometry such that it corresponds with the size and shape of the assembled fastener 1100. An installation tool (not shown) containing pulling jaws, may be positioned over the break-away pin tail section 1128 such that the jaws engage with the pin tail serrations 1140 and the end of the installation tool is in contact with the lock collar 1108 of the assembled fastener 1100. The installation tool is designed to apply the axial pulling force F on the pin 1103, while simultaneously applying an equal force F on the lock collar 1108 and/or sleeve enlarged preformed head. As the forces F are applied, axial movement of the pin 1103, in relation to the structure 1154, forces the sleeve 1102 to buckle, forming the upset head 1156 as well as forces the sleeve 1102 to expand radially outward into the prepared aperture 1152 of the structure. Continued application of axial pulling force F forces the lock collar 1108 to deform into place, between the sleeve 1102 and pin 1103, and separates the break-away pin tail 1128 from the installed fastener, completing the installation process.

Pin Head-Sleeve Integration

The pin end may be integrated to the sleeve by the interlocking grooves and subsequent rolling, although, it is however possible to employ other methods to attach the pin end and sleeve together so that the required interlocking feature to transfer the installation load needed to form the sleeve may be accomplished.

FIG. 12 illustrates side view assemblies of a pin and sleeve assembled with welding and/or chemical bonding, in accordance with an aspect of the present invention. The sleeve 1204 and pin 1202 may be attached at the interface 1206 by a welding process, such as spot welding or friction welding, or by chemical bonding to integrate the pin 1202 and sleeve 1204 together. The pin 1202 may have a smooth bonding surface 1208, or may incorporate interlocking groove geometry as shown in FIG. 6.

Thus a welding process, and/or a chemical bonding process can be used in conjunction with the interlocking grooves and rolling process previously described, such that the combination of interlocking grooves with a rolling process, chemical adhesives, and/or a welding process, when implemented properly, would provide the required engagement and bonds to enable the pin to have the adequate contact strength for forming the sleeve against the structure.

FIG. 13A illustrates a side view assembly of the fastener 700 of FIG. 7B having a cap 712 welded to the end of a portion 714 of the pin 600 protruding from an open end of the sleeve 400. The cap 712 may be secured by a friction welding process, done as a stand alone process or as a part of the assembly process. By securing the welded cap 712 to the end portion 714 of the pin 600 may provide extra strength to the pin/sleeve interlock while allowing the pin 600 to be manufactured with only a rolling operation, and thus without the need for heading (i.e. cold forming where metal is shaped by a die exerting a sufficient of amount of force) as currently required. The cap 712 may be used either with or without the permanent interlocked section 702, as described above.

FIG. 13B illustrates a side view assembly of the fastener 700 of FIG. 13A wherein the cap 712 is formed by pressing and deforming the end portion 714 of the pin 600 protruding out from the open end of the sleeve 400. The cap 712 may be used either with or without the permanent interlocked section 702, as described above.

By using the pin head processes described above, it may be possible to shorten the length of the interlocking portion of the sleeve and pin, resulting in a reduction in the weight of the fastener as well as reducing the blind side clearance required to install the fastener. In aerospace applications, reduced weight offers significant cost advantages and the reduced blind side clearance allows for a wider range of applications.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications are possible. Those skilled, in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

The invention claimed is:

1. A blind fastener for securing work piece having an open surface at a first side and a blind surface at a second side, the blind fastener comprising:
    a pin comprising:
        a main body section, the main body section comprising:
            a shear load bearing section integrally connected to a lock collar engagement section on a first end and a pin stalk section on a second end, the pin stalk section integrally connected to a series of pin sleeve integrating grooves;
        a tail section, having a series of serrations, integrally connected with the main body via a break notch;
    a deformable sleeve having a hollow tubular shank having a first sleeve end and a second sleeve end, the first sleeve end having a sleeve head having an opening for receiving the main body section of the pin, the series of serrations remaining outside the opening of the deformable sleeve during assembly of the blind fastener, the hollow tubular shank comprising:
        a first sleeve section integrally connected to the first sleeve end;
        a second sleeve section integrally connected to the first sleeve section; and
        a third sleeve section, integrally connected to the second sleeve section and the second sleeve end, having an internal surface for engaging the series of pin sleeve integrating grooves of the pin upon installation;

wherein an outer lower portion of the deformable sleeve, corresponding to the first sleeve section, includes additional material; and wherein the shear load bearing section includes expansion ridges and the additional material is forced radially inward into the expansion ridges providing a fastener hole-filling capability.

2. The blind fastener of claim 1, wherein the second sleeve section tapers inwardly from a first point to a second point, wherein the first point is integrally connected to the first sleeve section and wherein the second point is integrally connected to the third sleeve section.

3. The fastener of claim 1, wherein application of a load at the second sleeve end causes the second section to buckle downward and expand radially outward to form an upset head thereby creating a tight joint in an expected grip range of the blind fastener.

4. The blind fastener of claim 3, wherein the pin is configured to promote formation of the upset head such that the generated compressive forces do not severely damage a non-metallic composite type structure.

5. The blind fastener of claim 1, wherein a diameter of the shear load bearing section is less than an inner diameter of the first sleeve section of the sleeve providing little or no frictional load upon installation of the blind fastener.

6. The fastener of claim 1, wherein application of an assembly and integration load at the second sleeve section causes the internal surface of the third sleeve section to deform radially inward, engaging with the series of pin sleeve integrating grooves of the pin forming a permanent interlocking feature for securing the deformable sleeve and pin together.

7. The blind fastener of claim 1, wherein the sleeve further comprises a cap secured to the second sleeve end for providing radial rigidity to prevent dilation of the second sleeve end.

8. The blind fastener of claim 1, wherein the shear load bearing section includes expansion ridges and the additional material is forced radially inward into the expansion ridges providing a fastener hole-filling capability and wherein the sleeve further comprises a cap secured to the second sleeve end for providing radial rigidity to prevent dilation of the second sleeve end.

9. The blind fastener of claim 1, wherein interlocking and integration of the pin and the sleeve is accomplished in part or in total by welding or forming a cap to a pin head protruding out through the second sleeve end.

10. The blind fastener of claim 1, wherein interlocking and integration of the pin and the sleeve is accomplished in part or in total by chemically bonding a cap to a pin head protruding out through the second sleeve end.

11. The blind fastener of claim 1, wherein the blind fastener is capable of providing predictable hole-filling capabilities making it suitable for installation in both metallic and non-metallic structures.

* * * * *